United States Patent
Isetani (10) Patent No.: US 8,640,731 B2
(45) Date of Patent: *Feb. 4, 2014

(54) FLOW RATE CONTROL DEVICE

(75) Inventor: Junichi Isetani, Tokyo (JP)

(73) Assignee: Azbil Corporation, Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 12/810,362

(22) PCT Filed: Jan. 7, 2009

(86) PCT No.: PCT/JP2009/050080
§ 371 (c)(1),
(2), (4) Date: Jun. 24, 2010

(87) PCT Pub. No.: WO2009/088017
PCT Pub. Date: Jul. 16, 2009

(65) Prior Publication Data
US 2010/0269922 A1    Oct. 28, 2010

(30) Foreign Application Priority Data
Jan. 8, 2008 (JP) ................................. 2008-001166

(51) Int. Cl.
*F16K 31/12* (2006.01)

(52) U.S. Cl.
USPC ............................... 137/486; 431/12; 431/90

(58) Field of Classification Search
USPC ................... 137/485–492; 431/12, 89, 90
See application file for complete search history.

(56) References Cited

U.S. PATENT DOCUMENTS

| | | | |
|---|---|---|---|
| 2,072,384 A * | 3/1937 | Schmidt | ............................. 137/6 |
| 4,961,348 A | 10/1990 | Bonne | |
| 5,401,162 A * | 3/1995 | Bonne | ............................. 431/12 |
| 5,975,126 A * | 11/1999 | Bump et al. | ................ 137/487.5 |
| 7,926,323 B2 | 4/2011 | Ooishi et al. | |
| 2009/0277246 A1 | 11/2009 | Ooishi et al. | |
| 2010/0285414 A1 * | 11/2010 | Isetani | ............................. 431/75 |

FOREIGN PATENT DOCUMENTS

| | | |
|---|---|---|
| JP | 8-94070 A | 4/1996 |
| JP | 9-196367 A | 7/1997 |
| JP | 2002-147752 A | 5/2002 |
| JP | 2002-267157 A | 9/2002 |
| JP | 2002-267159 A | 9/2002 |
| JP | 2003-35612 A | 2/2003 |
| JP | 2004-514138 A | 5/2004 |
| JP | 2007-87029 A | 4/2007 |
| WO | 02/40992 A1 | 5/2002 |
| WO | 2007/036983 A1 | 4/2007 |

OTHER PUBLICATIONS

Chinese Office Action, dated Jun. 5, 2013, which issued during the prosecution of Chinese Patent Application No. 200980102101.7, which corresponds to the present application.

* cited by examiner

*Primary Examiner* — John Rivell
*Assistant Examiner* — R. K. Arundale
(74) *Attorney, Agent, or Firm* — Troutman Sanders LLP (57) ABSTRACT

A flow rate control device includes: a fuel gas supply channel having a flow rate adjusting valve; a thermal type mass flow rate sensor arranged in the supply channel; a calculation unit which calculates a thermal quantity flow rate of the fuel gas defined by a product of a volume flow rate of the fuel gas and a heat generation quantity per unit volume of the fuel gas according to an output from the thermal type sensor; and a flow rate control unit which controls the open degree of the flow rate adjusting valve according to a difference between a control target value for controlling the thermal quantity flow rate and the thermal quantity flow rate calculated by the calculation unit.

5 Claims, 7 Drawing Sheets

FLOW RATE CONTROL DEVICE

CROSS REFERENCE TO PRIOR APPLICATIONS

This application is a U.S. National Phase Application under 35 U.S.C. §371 of International Application No. PCT/JP2009/050080, filed on Jan. 7, 2009 and claims priority to Japanese Patent Application No. 2008-001166, filed on Jan. 8, 2008. The International Application was published in Japanese on Jul. 16, 2009 as WO 2009/088017 under PCT Article 21(2). All of the applications are herein incorporated by reference.

FIELD OF TECHNOLOGY

The present invention relates to a flow rate controlling device for controlling the flow rate of a fuel gas by focusing on the calorific value possessed by the fuel gas.

BACKGROUND OF THE INVENTION

When a fuel gas is combusted using a burner, prior to the fuel gas being fed to the governor, it is mixed with air and is fed to the governor as a mixed gas of the fuel gas and the air. The control of the air fuel ratio (A/F) for this mixed gas is indispensable in optimizing the mixed gas, or in other words, in optimizing the state of combustion of the fuel gas (to ensure the full combustion thereof).

This A/F ratio maintains the air/fuel ratio A/F at the uniform and ideal air/fuel ratio by measuring the fuel gas provision rate and the air provision rate (the mass flow) for the mixed gas, and adjusting the gas provision rate and the air provision rate based on the results of the measurement. (See, for example, Japanese Unexamined Patent Application Publication 2002-267159.) Thermal mass flow gauges, for example, may be used in the measurements of the amount of gas and air supplied.

On the other hand, when producing the mixed gas there are cases wherein various types of fuel gases having different compositions are used, or wherein there are differences in the composition even when the same type of fuel gas is used. In order to perform the A/F control under such circumstances, the calorific value of combustion in the fuel gas used or the calorific value per unit time is calculated and the calorific value of combustion or calorific value is fed back to the A/F control. (See, for example, Japanese Unexamined Patent Application Publication 2003-35612.)

Furthermore, in addition to air, oxygen may also be used when producing the mixed gas, and, in such a case, the mass flows of the fuel gas, the air, and the oxygen are each measured separately for the A/F control and the $O_2/F$ control (abbreviated here as oxygen/fuel ratio control). (See, for example, Japanese Unexamined Patent Application Publication 2007-87029 ("JP '029").)

Note that when the burner uses a glass tube sealed process, high precision control is required for the amount of calorific value of the mixed gas, that is, of the fuel. In other words, while on the one hand the amount of fuel gas supplied is controlled based on the mass flow of the fuel gas, measured by a thermal mass flow gauge, as described above, on the other hand the amounts of air and/or oxygen supplied relative to the amount of fuel gas supplied is controlled so as to have the respective ideal mixtures of fuel gas, air, and/or oxygen in the mixed gas.

However, even when control is performed in this way, when there is a change in the composition of the fuel gas, then rather than maintaining the calorific value of the mixed gas that includes the fuel gas at a desired control value, or rather than maintaining the calorific value of combustion or calorific value per unit time at a desired control value, conversely there is the danger that the air and/or oxygen mixing ratio relative to the fuel gas will vary due to the density of the fuel gas within the mixed gas varying as well, resulting in the danger of incomplete combustion of the fuel gas.

The object of the present invention is to provide a flow rate controlling device capable of controlling the flow of a fuel gas based on the calorific value by the fuel gas to stabilize, for example, a fuel gas at a constant calorific value, notwithstanding differences or changes in the composition of the fuel gas.

SUMMARY OF THE INVENTION

The aforementioned object is achieved through the flow rate controlling device according to the present invention, wherein the flow rate controlling device includes a flow rate adjusting valve capable of adjusting the flow rate of a fuel gas, disposed in a fuel gas supply duct; a thermal mass flow rate sensor, for measuring the mass flow rate of a fuel gas, disposed in the supply duct; a calculating portion for calculating, based on the output of the thermal mass flow rate sensor, the calorific flow rate of the fuel gas, defined as the product of the fuel gas volumetric flow rate and the calorific value per unit volume of the fuel gas; and a flow rate controlling portion for controlling the degree of opening of the flow rate controlling valve based on a difference between a control target value for controlling the calorific flow rate and the calorific flow rate calculated by the controlling portion.

Specifically, the fuel gas is a hydrocarbon combustible gas including, for example, a municipal gas or a natural gas such as methane, ethane, propane, butane, or the like.

The calculating portion includes a map, produced through calculations in advance, of the relationship between the output of the thermal mass flow rate sensor and the calorific flow rate of the fuel gas. In this case, the calculating portion can calculate the calorific flow rate of the fuel gas in accordance with the output of the thermal mass flow rate sensor based on the map.

Preferably, the flow rate controlling device according to the present invention may also be provided with another calculating portion for calculating a calculated calorific value per unit volume of the fuel gas; and a calculating portion for calculating the ratio of the calculated calorific value relative to a reference calorific value per unit volume of the fuel gas, based on a reference state.

Specifically, the other calculating portion includes another thermal-type sensor for calculating the calculated calorific value based on the output of the thermal-type sensor when in a state wherein the flow of the fuel gas is stopped, or for calculating the calculated calorific value.

Furthermore, when the thermal-type sensor driving conditions vary in two levels, the other calculating portion may calculate outputs from the thermal-type sensor at each level, and may calculate the calculated calorific value based on those outputs.

The flow rate controlling device according to the present invention calculates, based on the outputs of thermal mass flow rate sensors, a calorific flow rate, defined as the product of a volumetric flow rate of a fuel gas and the calorific value per unit volume of the fuel gas, and controls the degree of opening of a flow rate controlling valve so as to cause the calculated calorific flow rate to match a control target value, so that the fuel gas provision rate will have a uniform calorific flow rate in accordance with a control target value.

The result is that the flow rate controlling device according to the present invention controls the calorific flow rate of the fuel gas by focusing on the calorific value of the fuel gas, and enabling the provision of the effect of stabilizing the fuel gas at a uniform calorific value, even when the composition (type) of fuel gas is different from a desired composition (type), and when there is a change in the composition itself of the fuel gas.

The provision of the aforementioned map in advance enables the simple calculation of the calorific flow rate of the fuel gas based on the output of the thermal-type mass flow rate sensor, reducing the load on the flow rate controlling device according to the present invention when performing combustion control of the fuel gas.

Furthermore, calculating the aforementioned ratio of calorific value enables the flow rate controlling device according to the present invention to identify easily changes in the calorific value of the fuel gas, which, by extension, enables the detection of a change in composition of the fuel gas.

DETAILED DESCRIPTION OF THE INVENTION

Figure 1:
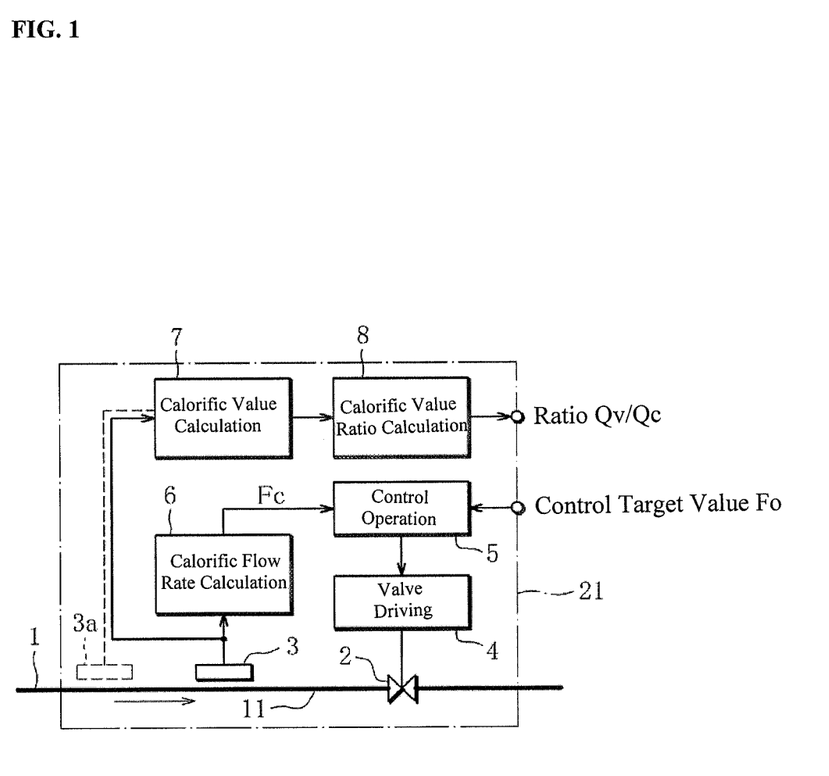
FIG. 1 is a block diagram illustrating schematically a flow rate controlling device as set forth in one example of embodiment according to the present invention.

As illustrated in FIG. 1, the flow rate controlling device 21 as set forth in the first example of embodiment is disposed in a fuel gas supply duct 1. The flow rate controlling device 21 comprises, fundamentally, a flow rate controlling valve (hereinafter termed simply a "valve") 2 for controlling the flow rate of a fuel gas within the supply duct 1, a thermal mass flow rate thermal-type sensor (hereinafter termed a "sensor") 3 for detecting the mass flow rate of the fuel gas, a driving circuit 4 for driving the valve 2, to adjust the degree of opening of the valve 2, and a control processing unit 5 for controlling the driving circuit 4.

More specifically, the control processing unit 5 performs feedback control of the degree of opening of the valve 2, through the driving circuit 4, so as to eliminate the difference between the calorific flow rate calculated from the output (the mass flow rate) from the sensor 3, described below, and a control target value (a calorific flow rate) that is set in the control processing unit 5, to adjust the calorific flow rate of the fuel gas.

Figure 2:
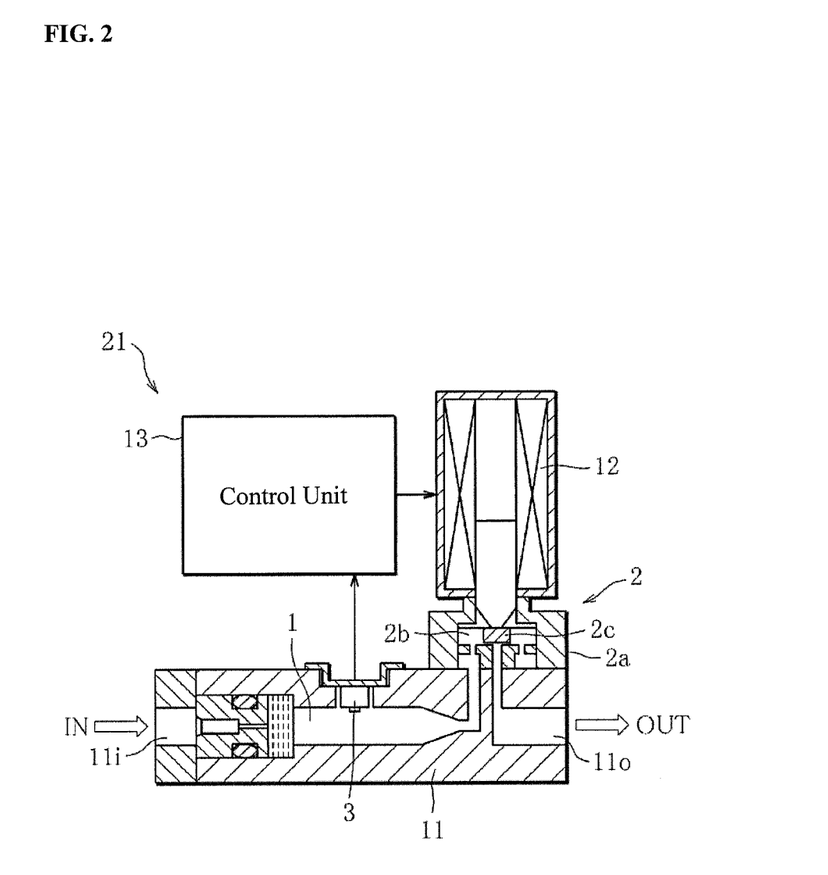
FIG. 2 is a diagram illustrating the structure of the flow rate controlling device of FIG. 1.

FIG. 2 illustrates a specific structure for a flow rate controlling device.

The flow rate controlling device has a pipe member 11, where the pipe member 11 forms a portion of the supplying path 1, an inlet 11i, and an outlet 11o. The sensor 3, when viewed from the axial direction of the pipe member 11, is attached in the center thereof, and has a detecting surface that is exposed to the fuel gas within the pipe member 11.

The valve 2 includes a valve casing 2a, where the valve casing 2a is attached to the outer peripheral surface of the pipe member 11 in the vicinity of the outlet 11o of the pipe member 11. The valve casing 2a has a valve duct 2b that is provided on the inside thereof, where the valve duct 2b forms a portion of the interior flow path of the pipe member 11. Additionally, a valve unit 2c is disposed within the valve casing 2a, where the valve unit 2c is driven by a solenoid mechanism 12 to adjust the degree of opening of the valve flow path 2b, or in other words, of the valve 2. The solenoid mechanism 12 is attached on the outside of the valve casing 2a.

The flow rate controlling device further includes a controlling unit 13. The controlling unit 13 is also disposed on the outside of the pipe member 11, and has a control processing unit 5, a driving circuit 4, and the like.

The pipe member 11, the valve 2, and the control unit 13 are all housed within a shared housing (not shown), where the flow rate controlling device is formed as a single module.

Note that the details of the fundamental structure of the flow rate controlling device described above are already known from, for example, JP '029, mentioned above.

A flow rate controlling device 21 according to the present invention was developed focusing on the output of the thermal-type mass flow rate sensor 3 (the mass flow rate) being proportional to the calorific flow rate of the fuel gas.

Specifically, a sensor 3 that is used for detecting a mass flow rate Fm of a fuel gas comprises, for example, a heater for heating a fuel gas (fluid) in the vicinity of the detection, and two temperature sensors for detecting the temperature distribution of a heated fuel gas, where the temperature difference detected by these temperature sensors is detected and outputted as the mass flow rate Fm. The temperature difference is produced through the temperature distribution of the fluid in the vicinity of the sensor changing depending on the flow of the fluid. Furthermore, the temperature distribution will vary depending on the heat dissipating rate a of the fuel gas and the flow speed (the volumetric flow rate Fv) of the fuel gas.

Note that the heat dissipating rate a of the fuel gas can be calculated according to Equation (1), below:

$$\alpha = \lambda/(\rho \times Cp) \quad (1)$$

where $\lambda$ is the thermal conductivity of the fuel gas, $\rho$ is the density of the fuel gas, and Cp is the specific heat of the fuel gas.

On the other hand, the calorific value of the fuel gas can be expressed as the calorific value Qv per unit volume of the fuel gas, where this calorific value Qv will vary depending on the composition (type) of fuel gas. For example, Table 1, below, shows hydrocarbon fuel gases that are commonly used as fuel gases, and the calorific values Qv for these fuel gases. Here the unit volume indicates the volume when the fuel gas is in a reference condition (such as, 0° C.):

TABLE 1

| Composition of Fuel Gas | Calorific Value per Unit Volume |
|---|---|
| LNG (Liquefied Natural Gas) 45 MJ | 45.0 [MJ/m³] |
| LNG (Liquefied Natural Gas) 65 MJ | 46.0 [MJ/m³] |

TABLE 1-continued

| Composition of Fuel Gas | Calorific Value per Unit Volume |
|---|---|
| Methane (CH$_4$) 90% + Propane (C$_3$H$_8$): 10% | 46.1 [MJ/m$^3$] |
| Methane (CH$_4$) 90% + Butane (C$_4$H$_{10}$): 10% | 49.3 [MJ/m$^3$] |

As is clear from Table 1, the calorific value Qv by the fuel gas varies depending on the type, or composition, of the fuel gas. The differences between the calorific values Qv is primarily caused by differences in the density ρ that is determined by the composition of the gas. Consequently, when there is a change in the composition of the fuel gas that is subject to detection by the sensor 3, there will also be a change in the density ρ of the fuel gas. In this sense, the change in the density ρ in this way changes the mass flow rate Fm that is detected by the sensor 3.

Figure 3:
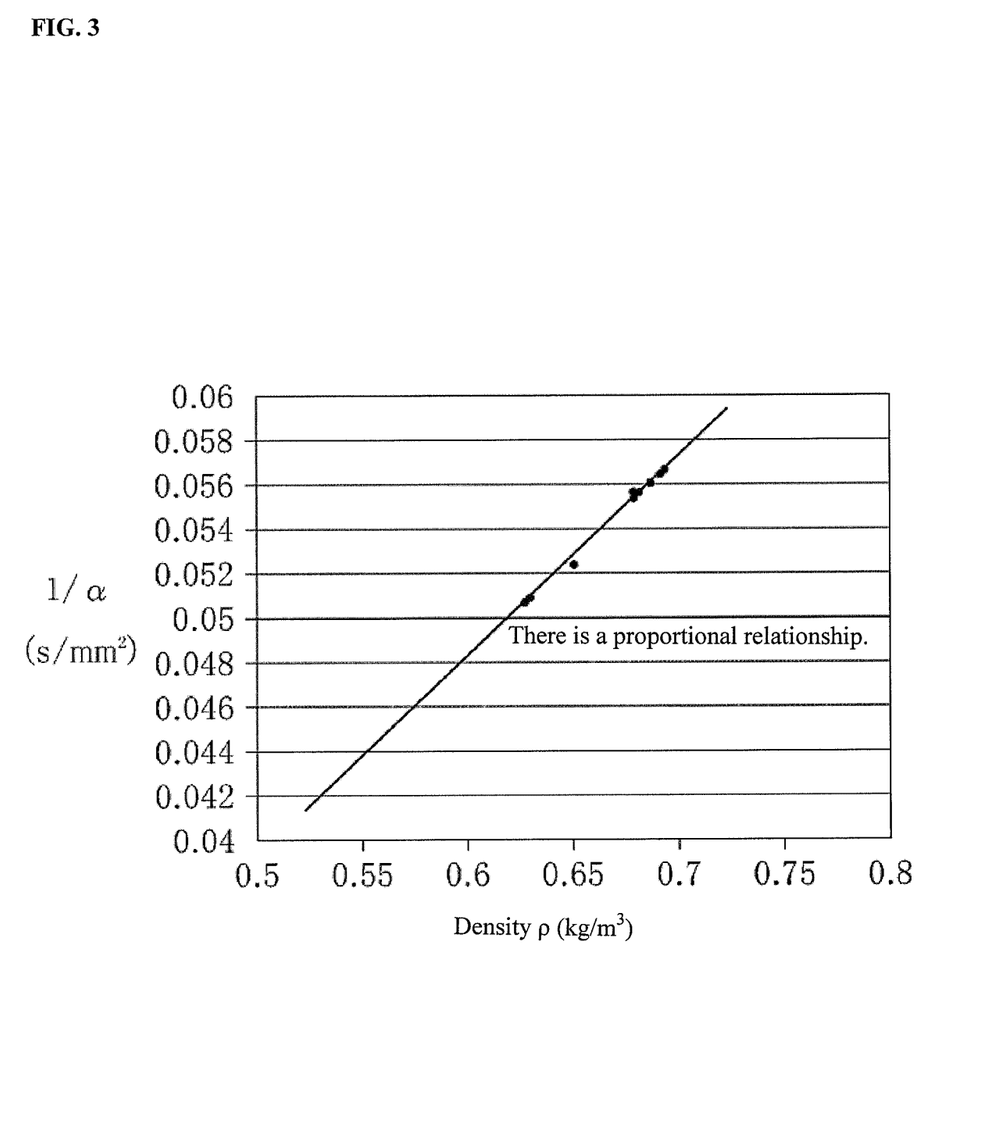
FIG. 3 is a graph illustrating the relationship between the fuel gas density and the inverse ($1/\alpha$) of the thermal dispersion rate a for αhydrocarbon fuel gas.

On the other hand, FIG. 3 illustrates the relationship between the density ρ of the hydrocarbon fuel gas and the inverse (=1/α) of the heat dissipating rate α, described above. As is clear from FIG. 3, the density ρ of the fuel gas is proportional to the inverse of the heat dissipating rate α. That is, the relationship between the density ρ and the heat dissipating rate α is expressed by Equation (2), below:

$$1/\alpha = K1 \times \rho \quad (2)$$

Here K1 is a proportionality constant.

The proportional relationship in Equation (2) applies regardless of differences in the compositions of the hydrocarbon fuel gases.

Figure 4:
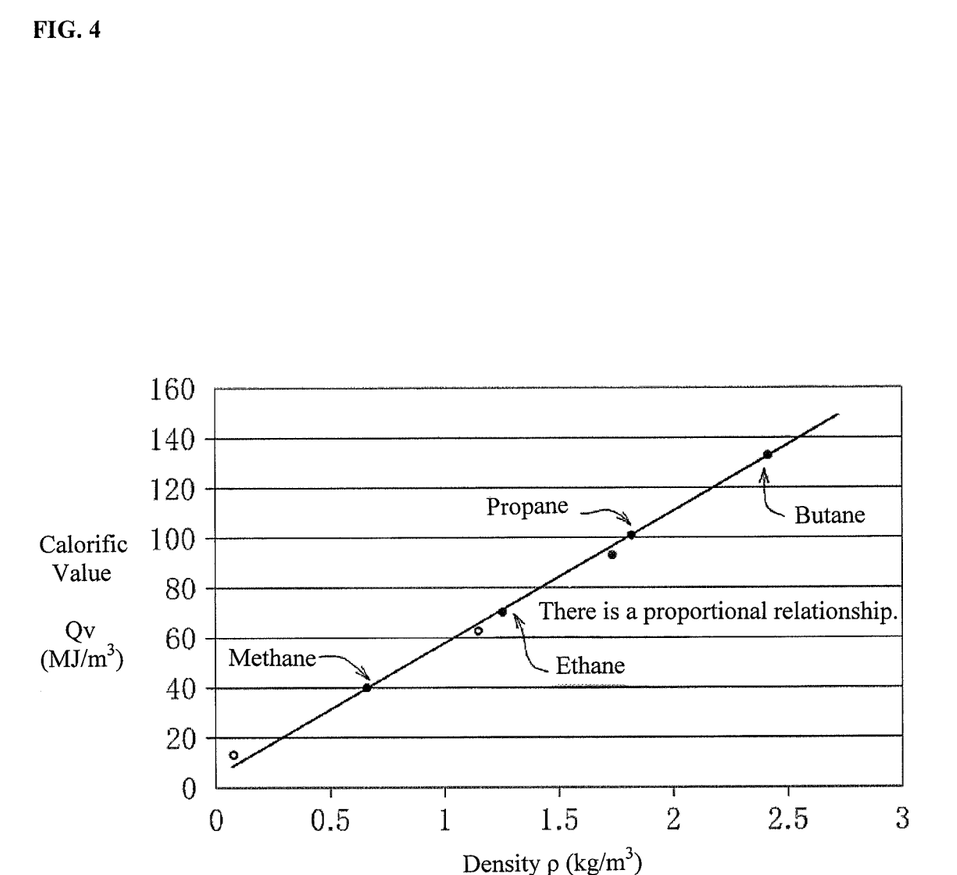
FIG. 4 is a graph illustrating the relationship between the density of the fuel gas and the calorific value per unit volume of the fuel gas for hydrocarbon fuel gasses.

Additionally, FIG. 4 illustrates the relationship between the density ρ of the hydrocarbon fuel gas and the calorific value Qv. As is clear from FIG. 4, the calorific value Qv is proportional to the density ρ of the fuel gas. That is, the relationship between the calorific value Qv and the density ρ is expressed by Equation (3), below:

$$Qv = K2 \times \rho \quad (3)$$

Here K2 is a proportionality constant.

The proportional relationship in Equation (3) applies regardless of differences in the composition of the fuel gas.

As is clear from Equations (2) and (3), because of the mutual relationships between the inverse of the heat dissipating rate α and the calorific value Qv, the temperature distribution in the fuel gas (fluid) in the vicinity of the sensor 3 can also be said to vary with the volumetric flow rate Fv and the calorific value Qv of the fuel gas (fluid).

This indicates that, regardless of the composition of the hydrocarbon fuel gas, the output of the sensor 3 (the mass flow rate Fm) is proportional to the calorific value Qv of the fuel gas, and, at the same time, is also proportional to the flow rate (volumetric flow rate) Fv of the fuel gas as well.

Figure 5:
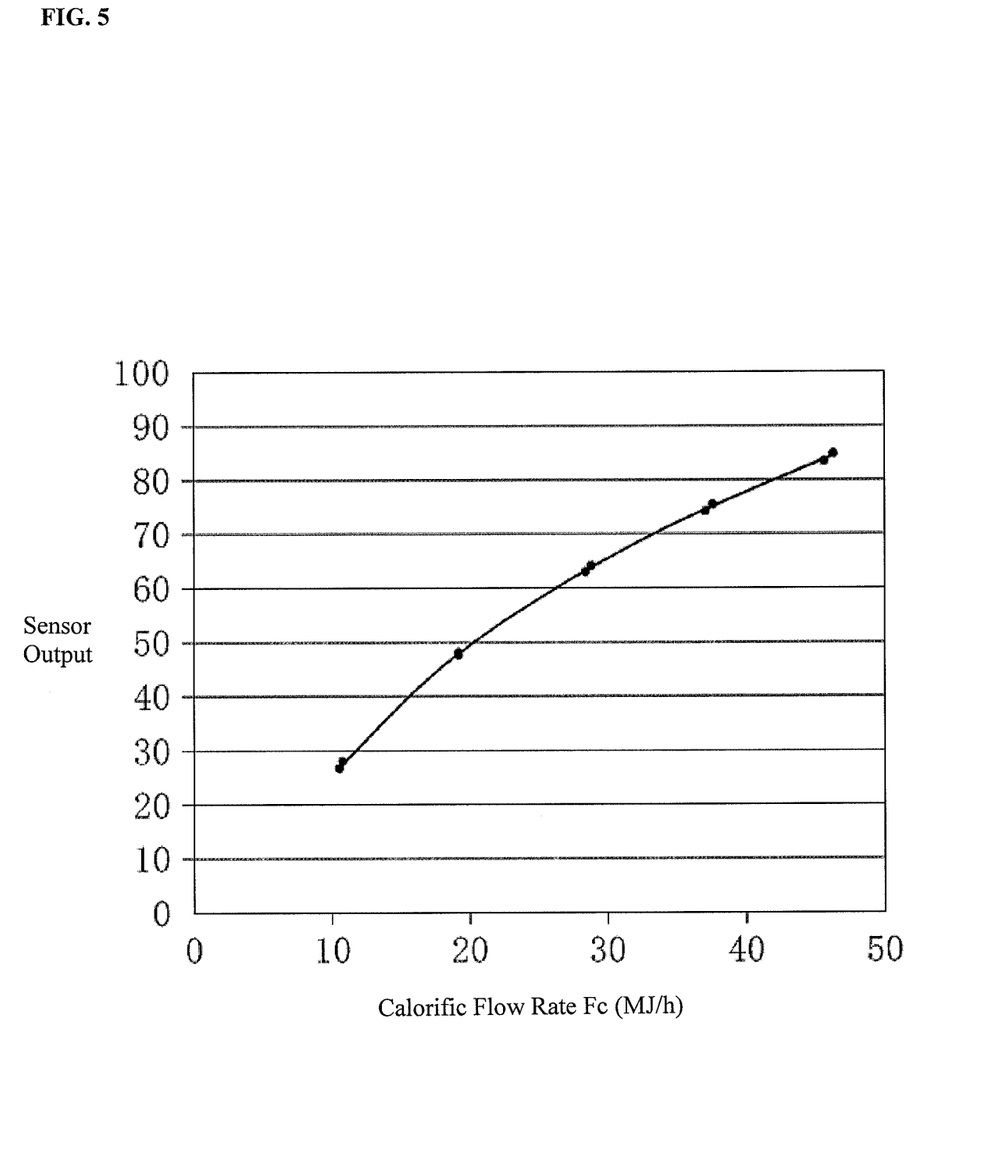
FIG. 5 is a graph illustrating the relationship between the calorific flow rate of the fuel gasses and the outputs of a thermal-type sensor.

Here the present inventors discovered that if a calorific flow rate Fc is defined as the product of the calorific value Qv of the fuel gas and the flow rate (volumetric flow rate) Fv, then the calorific flow rate Fc and the output of the thermal mass flow sensor 3 (the mass flow rate Fm) will have a single relationship as illustrated in FIG. 5.

Because of this, the flow rate controlling device 21 as set forth in the present invention, as illustrated in FIG. 1, is further provided with a calculating portion 6 that not only calculates the mass flow rate Fm of the fuel gas, as the output of the sensor 3, but also a calorific flow rate Fc of the fuel gas based on the output of the sensor 3 (the mass flow rate Fm). Specifically, the calculating portion 6 has a memory wherein is stored the map illustrated in FIG. 5, for reading out the calorific flow rate Fc in accordance with the output, based on the output from the sensor 3 (the mass flow rate Fm), to provide the read-out calorific flow rate Fc to the control processing unit 5. Note that the map in FIG. 5 is created through calculating in advance the calorific flow rates Fc corresponding to the outputs of the sensor 3 (the mass flow rate Fm)

In the control processing unit 5, a control target value Fo is applied in advance, where this control target value Fo is a calorific flow rate corresponding, in the present invention, to a calorific value, used for controlling directly the calorific value applied to the combusting device, or, specifically, a burner. The control processing unit 5 calculates the difference between the control target value Fo and the calorific flow rate Fc provided from the calculating portion 6, to control the degree of the opening of the valve 2, through the driving circuit 4, so that the difference will go to zero.

Because of this, even if there were to be a change in the composition of the fuel gas, the flow rate controlling device 21 would still be able to control the flow rate (the calorific value Qv) of the fuel gas to match the control target value Fo, enabling the fuel gas to be supplied stably to the burner with a desired calorific flow rate Fc.

In more detail, in a typical conventional flow rate controlling device, the mass flow rate of the fuel gas would be controlled based on the output of the sensor 3 (the mass flow rate Fm). However, in the flow rate controlling device 21 according to the present invention, the focus is on the calorific value Qv of the fuel gas, and a calorific flow rate Fc is calculated based on the output of the sensor 3, to control directly the calorific flow rate (the calorific value) itself of the fuel gas. Because of this, even if there were a change in the mass flow rate and/or the composition of the fuel gas, still the flow rate controlling device 21 according to the present invention would be able to control uniformly the calorific flow rate Fc (the calorific value) of the fuel gas applied to the burner 26, through controlling the degree of the opening of the valve 2.

The result is that, for the flow rate controlling device 21 according to the present invention, there is no need to determine whether a factor that is causing a change in the output of the sensor 3 is a change in the mass flow rate of the fuel gas or a change in the composition of the fuel gas, but rather the flow rate controlling device 21 can perform the flow rate control for the fuel gas with stability.

Note that in order to combust completely and with stability the fuel gas described above it is necessary to produce a mixed gas wherein an appropriate proportion of air or oxygen is mixed into the fuel gas. Normally the ideal air/fuel ratio (A/F) or ideal oxygen/fuel ratio (O$_2$/F) is as illustrated in Table 2, below, when the hydrocarbon fuel gas is combusted completely:

TABLE 2

| Fuel Gas | A/F | O$_2$/F |
|---|---|---|
| Methane (CH$_4$) | 9.52 | 2.0 |
| 13A (LNG) | 11.0 | 2.3 |
| Ethane (C$_2$H$_6$) | 16.7 | 3.5 |
| Propane (C$_3$H$_8$) | 13.8 | 5.0 |
| Butane (C$_4$H$_{10}$) | 30.9 | 6.5 |

When there is a change in the type or composition of the fuel gas, the A/F and O$_2$/F will also change, and thus in order to completely combust the fuel gas, that is, the mixed gas, it is necessary to adjust the flow rate of the air and/or the oxygen in the mixed gas depending on the composition and flow rate of the fuel gas within the mixed gas.

Figure 6:
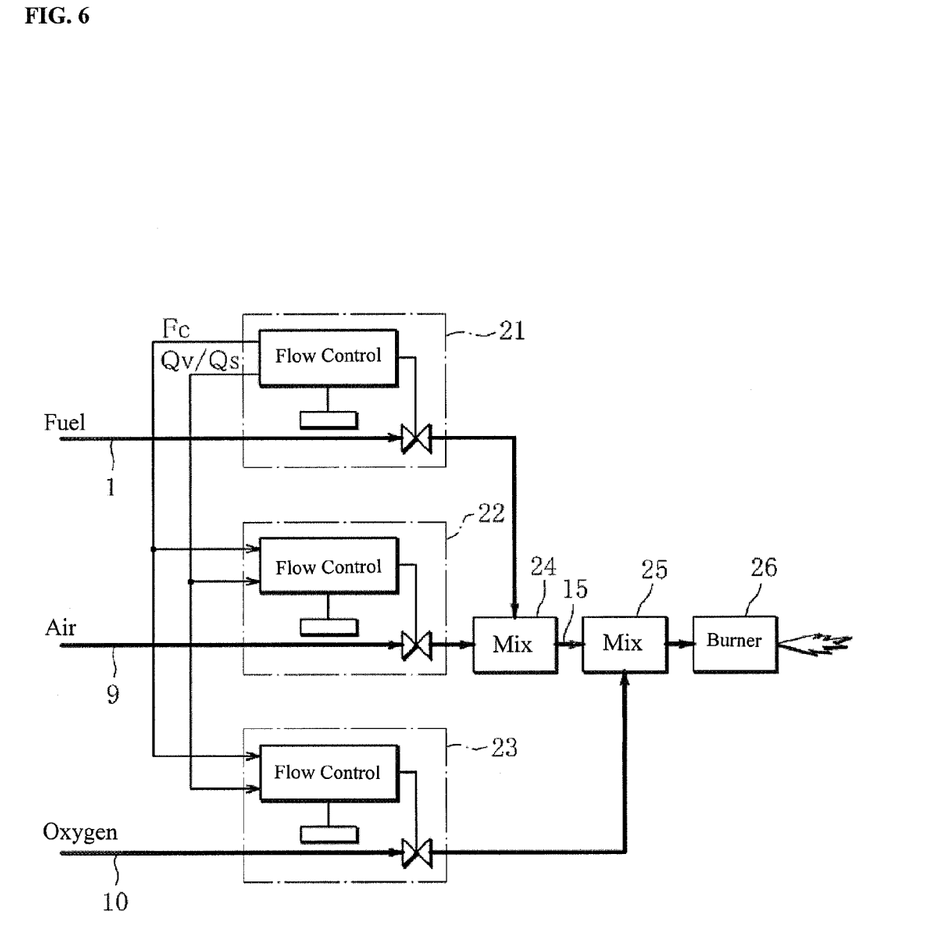
FIG. 6 is a block diagram illustrating schematically a fuel providing device that includes the flow rate controlling device according to the present invention.

For example, FIG. 6 illustrates schematically a supply system for supplying mixed gas to a burner 26. This supply system includes, in addition to the aforementioned fuel gas supply duct 1, an air supply duct 9 and an oxygen supply duct 10. The supply duct 1 is connected through a mixing device 24 to the supply duct 9, where this mixing device 24 is connected to the burner 26 through a mixed gas supply duct 15. On the other hand, the supply duct 10 is connected through the mixing device 25 to the supply duct 15.

The flow rate controlling device 21 is disposed in the supply duct 1, and flow rate controlling devices 22 and 23, which are identical to the flow rate controlling device 21, are disposed in the respective supply ducts 9 and 10. These flow rate controlling devices 22 and 23 are used for controlling, respectively, the flow rates for the air and oxygen. Because of this, the supply system of FIG. 6 produces a mixed gas from fuel gas, air, and oxygen, and supplies the mixed gas thus produced to the burner 26.

When the flow rate controlling device 21 according to the present invention is used in a supply system as set forth above, the flow rate controlling device 21, as illustrated in FIG. 1, will be different from the flow rate controlling devices 22 and 23, having an additional calculating portions 7 and an additional calculating portion 8. Note, however, that these flow rate controlling devices 21, 22, and 23 may instead have identical structures.

The calculating portion 7 calculates the calorific value $Q_v$ per unit volume of the fuel gas based on the output of the sensor 3 when the flow of the fuel gas is in a stopped state. Because of this, the valve 2 is closed to stop the flow of the fuel gas prior to the calculating portion 7 calculating the calorific value $Q_v$. When in this state, the calculating portion 7 receives the supply of the output from the sensor 3, and, based on this output, calculates the mass, or in other words, the density $\rho$, of the fuel gas. More specifically, as is clear from Equation (3), because the fuel gas density $\rho$ and calorific value $Q_v$ have a proportional relationship, the calculating portion 7 can calculate the calorific value $Q_v$ based on the density $\rho$ based on this proportional relationship.

On the other hand, the calculating portion 8 calculates the ratio between the calorific value $Q_v$, calculated by the calculating portion 7, and a known calorific value $Q_s$, or in other words, calculates $Q_v/Q_s$. The calorific value $Q_s$ indicates the calorific value per unit volume when the fuel gas is in a reference condition (for example, at 0° C.).

Specifically, the calorific value $Q_s$ is calculated in advance for each type of fuel gas, and these calorific values $Q_s$ are stored in a table in a memory (not shown) in the calculating portion 8. Because of this, the calculating portion 8 is able to select, from the table, the calorific value $Q_s$ corresponding to the fuel gas that is subject to control, and to calculate the ratio $Q_v/Q_s$ based on the selected calorific value $Q_s$.

This type of ratio $Q_v/Q_s$ is an indicator indicating how different the calculated calorific value $Q_v$ is from the calorific value $Q_s$. Note that the primary cause for a change in the calorific value $Q_v$ is a change in the composition of the fuel gas.

When there has been a change in composition of the fuel gas, the ideal air/fuel ratio of A/F and/or in the ideal oxygen/fuel ratio $O_2/F$ for completely combusting the fuel gas will also change. Because of this, the ratio $Q_v/Q_s$, calculated by the flow rate controlling device 21, is provided to the flow rate controlling devices 22 and 23, where the flow rate controlling devices 22 and 23 control the air and oxygen flow rates taking the ratio $Q_v/Q_s$ into account. The result is that it is possible to optimize the proportions of air and oxygen included in the mixed gas that is supplied to the burner 26, from the perspective of the ideal air/fuel ratio of A/F or the ideal oxygen/fuel ratio $O_2/F$, to enable full combustion of the mixed gas, that is, the fuel gas.

The present invention is not limited to the example of embodiment set forth above, but rather can be buried in a variety of ways. For example, the flow rate controlling devices 22 and 23, as illustrated in FIG. 6, may control the proportions of air and oxygen included in the mixed gas based on the calorific flow rate Fc that is calculated by the flow rate controlling device 21, instead of on the ratio $Q_v/Q_s$.

In the case of the flow rate controlling device 21 as set forth in the first example of embodiment, it is necessary to perform an operation to close the valve 2, that is, to stop the flow of the fuel gas within the supply duct 1, when calculating the calorific value $Q_v$ of the fuel gas.

However, it is possible for the flow rate calculating device 21 to include also a reservoir chamber for holding the fuel gas, without producing a flow in the fuel gas, within the pipe member 11, and a thermal-type sensor 3a (illustrated in FIG. 1), separate from the aforementioned sensor 3, disposed in that reservoir chamber. In this case, it is possible for the calculating portion 72 calculate the calorific value $Q_v$ per unit volume of the fuel gas based on the output of the sensor 3a in a state wherein the fuel gas is flowing.

Figure 7:
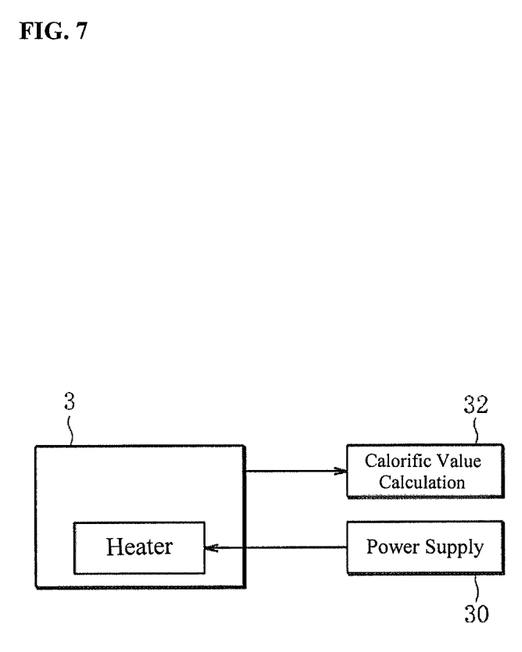
FIG. 7 is a diagram illustrating a modified example of a calculating portion for calculating the calorific value in the fuel gas.

Additionally, the flow rate controlling device as illustrated in FIG. 7 may include, instead of the calculating portion 7, a parameter controlling portion 30 that can switch, between two levels, a heater temperature parameter (the difference between the fuel gas temperature and the heater temperature), for the heater, which is a driving condition for the sensor 3, and may be provided with a calculating portion 32 for calculating the calorific value $Q_v$ based on the output from the sensor 3 under these driving conditions.

Additionally, as disclosed in, for example, Japanese Examined Patent Application Publication 2004-514138, when used as a thermal mass flow rate sensor of a type wherein the mass flow rate Fm is calculated from the heater driving current when the heater temperature is maintained at a constant value, the calorific value $Q_v$ may be calculated based on the outputs of the sensor 3 at each level when the heater temperature is switched between the two levels.

Specifically, the calculating portion 32 may calculate a thermal conductivity $\lambda$ of the fuel gas based on a difference in the outputs of the sensors 3, and may calculate the calorific value $Q_v$ in accordance with the proportionality relationship between the thermal conductivity $\lambda$ and the density $\rho$ of the fuel gas (referencing the aforementioned Equation (3)).

Furthermore, the flow rate controlling device according to the present invention is also able to output the calorific flow rate Fc, calculated by the calculating portion 6, and the output of the sensor 3 (the mass flow rate Fm) in parallel. Furthermore, the flow rate controlling device according to the present invention may select either flow rate control of the fuel gas based on the calorific flow rate Fc or flow rate control of the fuel gas based on the mass flow rate.

Furthermore, the flow rate controlling device according to the present invention may include, as appropriate, means, or the like, for providing known temperature correcting functions in regards to the temperature of the fuel gas.

The invention claimed is:

1. A flow rate controlling device comprising: a flow rate adjusting valve capable of adjusting a flow rate of a fuel gas, disposed in a supply duct for the fuel gas; a thermal mass flow rate sensor measuring a mass flow rate of a fuel gas, disposed in the supply duct and outputting an output that corresponds to a temperature distribution of the fuel gas, which varies depending on a heat dissipating rate of the fuel gas and a volumetric flow rate, in a vicinity of the thermal mass flow rate sensor; a first calculating portion calculating, a calorific flow rate of the fuel gas, defined as the product of the volumetric flow rate of the fuel gas and the calorific value per unit volume of the fuel gas, based on the output, is calculated from the temperature distribution of the fuel gas in the vicinity of the thermal mass flow rate sensor, from the thermal mass flow rate sensor, a proportional relationship between an inverse of the heat dissipating rate of the fluid gas and a density of the fuel gas, and a proportional relationship between the calorific value per unit volume of the fuel gas and the density of the fuel gas; and a controlling portion controlling a degree of opening of the flow rate controlling valve based on a difference between a control target value for controlling the calorific flow rate and a calorific flow rate calculated by the calculating portion, wherein the first calculating portion includes a map that is produced through calculating, in advance, a single relationship between the output of the thermal mass flow sensor and the calorific mass flow of the fuel gas, the fuel gas is a hydrocarbon combustible gas, and the single relationship applies to a plurality of compositions of the fuel gas.

2. A flow rate controlling device according to claim 1, further comprising:

a second calculating portion calculating a calculated calorific value per unit volume of the fuel gas; and a third calculating portion calculating a ratio of the calculated calorific value to a reference calorific value per unit volume for any fuel gas in a reference state.

3. A flow rate calculating device according to claim 2, wherein:

the second calculating portion calculates the calculated calorific value based on the output of the thermal mass flow rate sensor when in a state wherein the flow of the fuel gas is stopped.

4. A flow rate controlling device according to claim 2, wherein:

the second calculating portion includes a calorific sensor calculating the calculated calorific value.

5. A flow rate controlling device according to claim 2, wherein:

the second calculating portion calculates respective outputs from the thermal mass flow rate sensor at each level when the driving condition for the thermal mass flow sensor has changed to two levels, and calculates the calculated calorific value based on those outputs.

* * * * *